United States Patent [19]

Sinchuk et al.

[11] 3,826,916

[45] July 30, 1974

[54] MULTI-CHANNEL DEVICE FOR OPTICAL CONTROL OF CONVERTER BRIDGE RECTIFIERS IN D.C. TRANSMISSION LINES

[76] Inventors: Georgy Georgievich Sinchuk, ulitsa Rentgena 7, kv. 28; Gennady Vasilievich Smirnov, Prospekt Nauki 14, korpus 4, kv. 9, both of Leningrad, U.S.S.R.

[22] Filed: July 2, 1973

[21] Appl. No.: 375,861

[52] U.S. Cl. .................. 250/208, 250/214, 307/311, 321/41

[51] Int. Cl. ..... H01j 39/12, H02m 1/02, H03k 3/42

[58] Field of Search ........... 250/208, 214, 552, 551; 321/41; 307/311

[56] References Cited

UNITED STATES PATENTS

| | | | |
|---|---|---|---|
| 3,386,027 | 5/1968 | Kilgore et al. | 250/551 |
| 3,459,943 | 8/1969 | Harnden, Jr. | 250/208 |
| 3,524,986 | 8/1970 | Harnden, Jr. | 250/552 |

*Primary Examiner*—James W. Lawrence
*Assistant Examiner*—T. N. Grigsby
*Attorney, Agent, or Firm*—Eric H. Waters

[57] ABSTRACT

A multi-channel device is proposed for optical control of converter rectifiers in D.C. transmission lines comprising *n* identical channels, *n* being equal to the number of arms in a converter bridge, each channel including a shaper of wide square pulses connected in series with a pulse-width modulation converter of the light flux, all these elements being at the earth potential; as well as a photoreceptor and a control pulse amplifier which are connected in series at the rectifier potential, while the shaper of wide square pulses is provided with a master pulse trigger which has its input connected to a primary pulse transmitter, and the pulse-width modulation converter of the light flux includes a single stage transistor amplifier whose input is coupled to said master pulse trigger and whose output is coupled to a semiconductor optical modulator serving to receive optical signals from a light flux emission source and to transmit modulated signals to an optical splitter which, in turn, feeds split signals to said photoreceptor at the potential of the gate.

5 Claims, 3 Drawing Figures

MULTI-CHANNEL DEVICE FOR OPTICAL CONTROL OF CONVERTER BRIDGE RECTIFIERS IN D.C. TRANSMISSION LINES

The present invention relates to high-voltage D.C. transmission lines, and more particularly to multi-channel devices used for optical control of converter bridge rectifiers in D.C. transmission lines as well as for control of rectifiers in powerful test benches.

The prior art knows multi-channel devices for optical control of rectifiers in D.C. transmission lines, which comprise primary pulse transmitters, shapers of narrow optical "start" and "stop" pulses and light emission sources, all these elements being connected in series at the earth potential, as well as photoreceptors and control pulse amplifiers also connected in series but at the rectifier potential.

Such a device also comprises a control pulse shaper arranged at the rectifier potential.

The known devices for optical control of rectifiers suffer from a common disadvantage which resides in that the process of shaping wide control pulses in them takes place at the rectifier potential. It is only the shaping of narrow optical "start" and "stop" pulses that is performed at the earth potential. Hence, the process of control becomes less reliable and less jamproof since there may appear spurious pulses in the system. Besides, this requires that the system should consist of two independent optical control channels to restore the normal operation of the arrangement in case primary pulses disappear for one or more periods.

An object of the present invention is to eliminate the above disadvantages.

Another object of the invention is to provide a multi-channel device for optical control of rectifiers which will be highly reliable in operation, insensitive to high-level electromagnetic interference and ensure easy optical splitting of a light flux.

The above requirements are satisfied by shaping a continuous wide light pulse at the earth potential which can be split, if necessary, into a plurality of optical signals without expanding the electrical circuitry at the earth potential.

These objects are achieved by that in a multi-channel device for optical control of converter bridge rectifiers in D.C. transmission lines, which comprises $n$ identical channels, $n$ being equal to the number of arms in the converter bridge, each channel including a shaper of wide square pulses with a primary pulse transmitter in series with a pulse-width modulation converter of the light flux which converter is provided with a light flux emission source, all these elements being at the earth potential, and, at the rectifier potential, a photoreceptor connected in series with a control pulse amplifier, each shaper of wide square pulses is, according to the invention, provided with a master pulse trigger which has its input connected to a primary pulse transmitter and its output connected to a single-stage transistor amplifier serving as an input component of the pulse-width modulation converter of the light flux, the converter being provided with an optical modulator to receive focused signals from the light flux emission source and the modulator being electrically connected to the single-stage transistor amplifier, while the output of the pulse-width modulation converter of the light flux is connected to an optical splitter receiving modulated optical signals from the semiconductor optical modulator and delivering split optical signals to photoreceptors arranged at the rectifier potential.

It is expedient that the input of each single-stage transistor amplifier be connected to a common cutoff bias source intended to prevent control pulses from arriving to high-voltage rectifiers of the converter bridge. The inputs of the single-stage transistor amplifiers in the pulse-width modulation converter of the light flux should preferably be connected to a common resistor serving as a cutoff bias element for all the single-stage transistor amplifiers.

It is also expedient that the optical splitter of the modulated optical signal be made as a plurality of flat reflectors, such as mirrors, arranged in the path of the modulated optical signal.

Due to a pulse-width modulation at the earth potential, the device is reliable in operation and insensitive to optical and electromagnetic interference.

Moreover, the light flux in the device is split with the aid of mirrors which simply break up the light beam.

The present invention can be used for controlling mercury-arc and semiconductor rectifiers.

The invention will be better understood from the following description of an embodiment thereof given by way of example with reference to the accompanying drawings, in which.

A multi-channel device for optical control of converter bridge rectifiers in D.C. transmission lines comprises $n$ channels according to the number of arms in the converter bridges, the channels being identical. Given below, therefore, is a description of only one channel.

Figure 1:
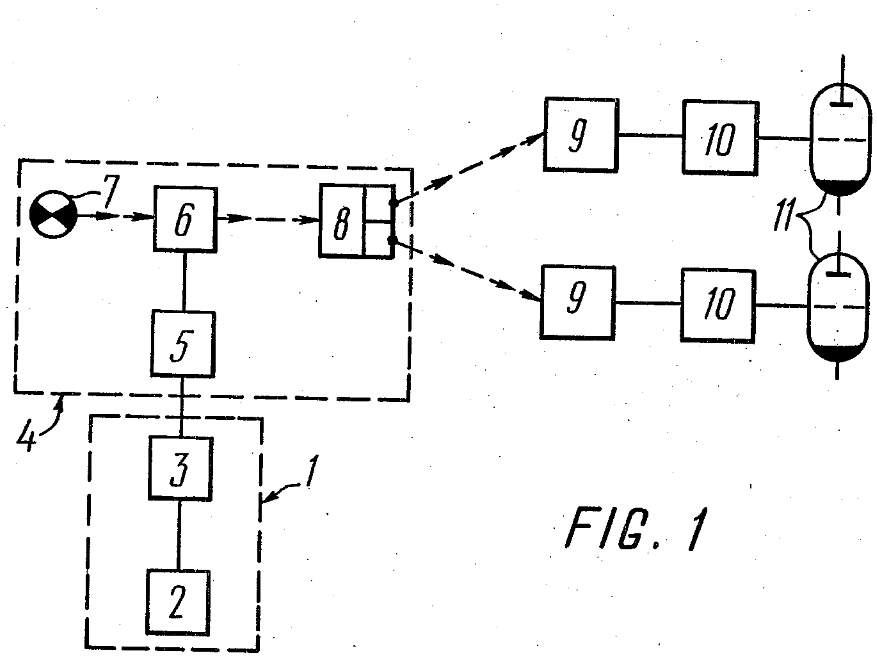
FIG. 1 is a block diagram of one channel of a device for optical control of a rectifier.

Included in every channel (FIG. 1) at the earth potential is a shaper 1 of wide square pulses comprising a primary pulse transmitter 2 whose output is connected to a master pulse trigger 3. Connected to the output of the master pulse trigger 3 is a pulse-width modulation (PWM) converter 4 of the light flux comprising a single-stage transistor amplifier 5 which is electrically connected to a semiconductor optical modulator 6 receiving focused signals from a light flux emission source 7. After modulation in the semiconductor optical modulator 6, the light flux arrives to an optical splitter 8 where it is split into individual optical signals whose number is equal to that of the rectifiers in an arm of the converter bridge. Connected in series at the gate potential are a photoreceptor 9 which receives optical signals from the optical splitter 8, an output amplifier 10 of control pulses and a high-voltage rectifier 11.

Figure 2:
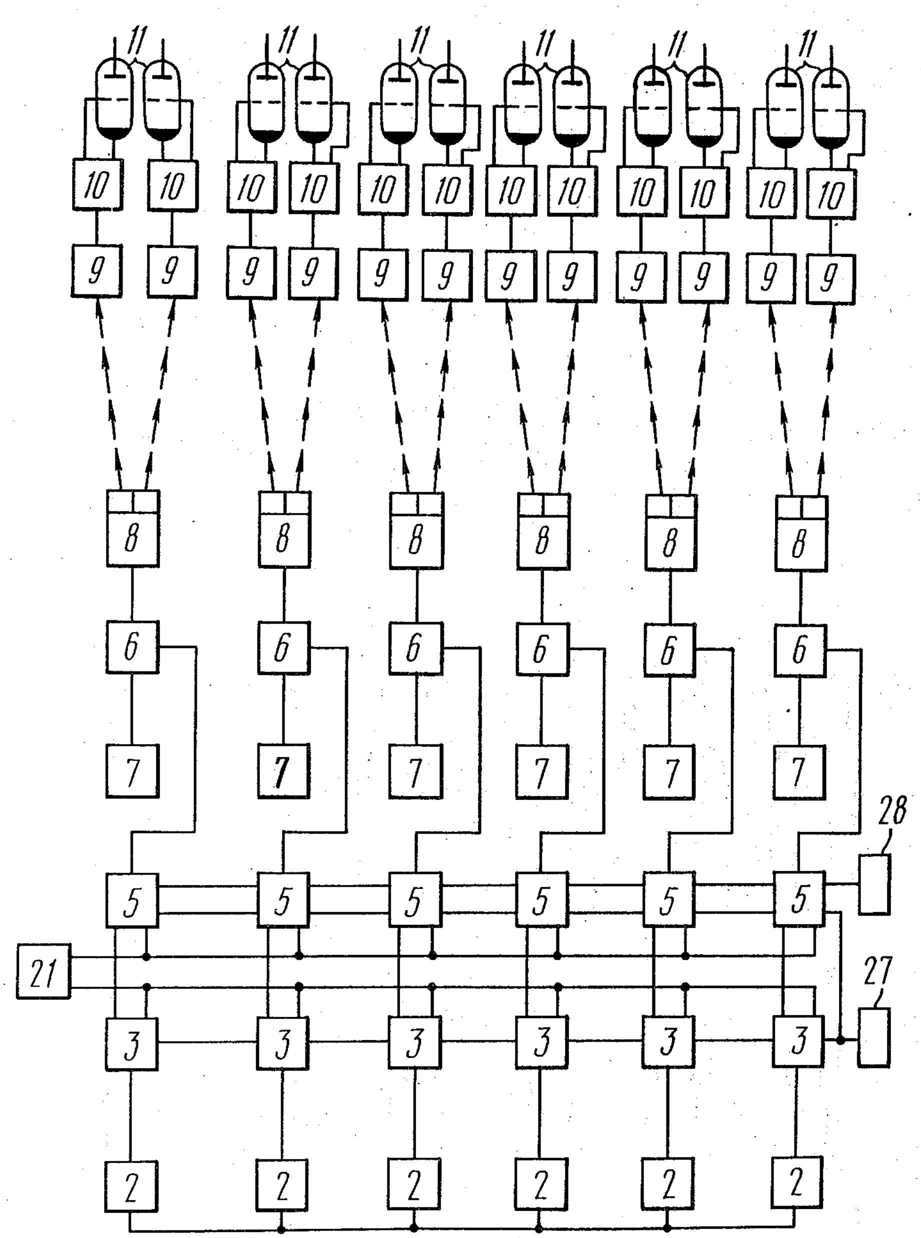
FIG. 2 is a block diagram of the device for optical control of a 12-channel converter bridge using rectifiers.
Figure 3:
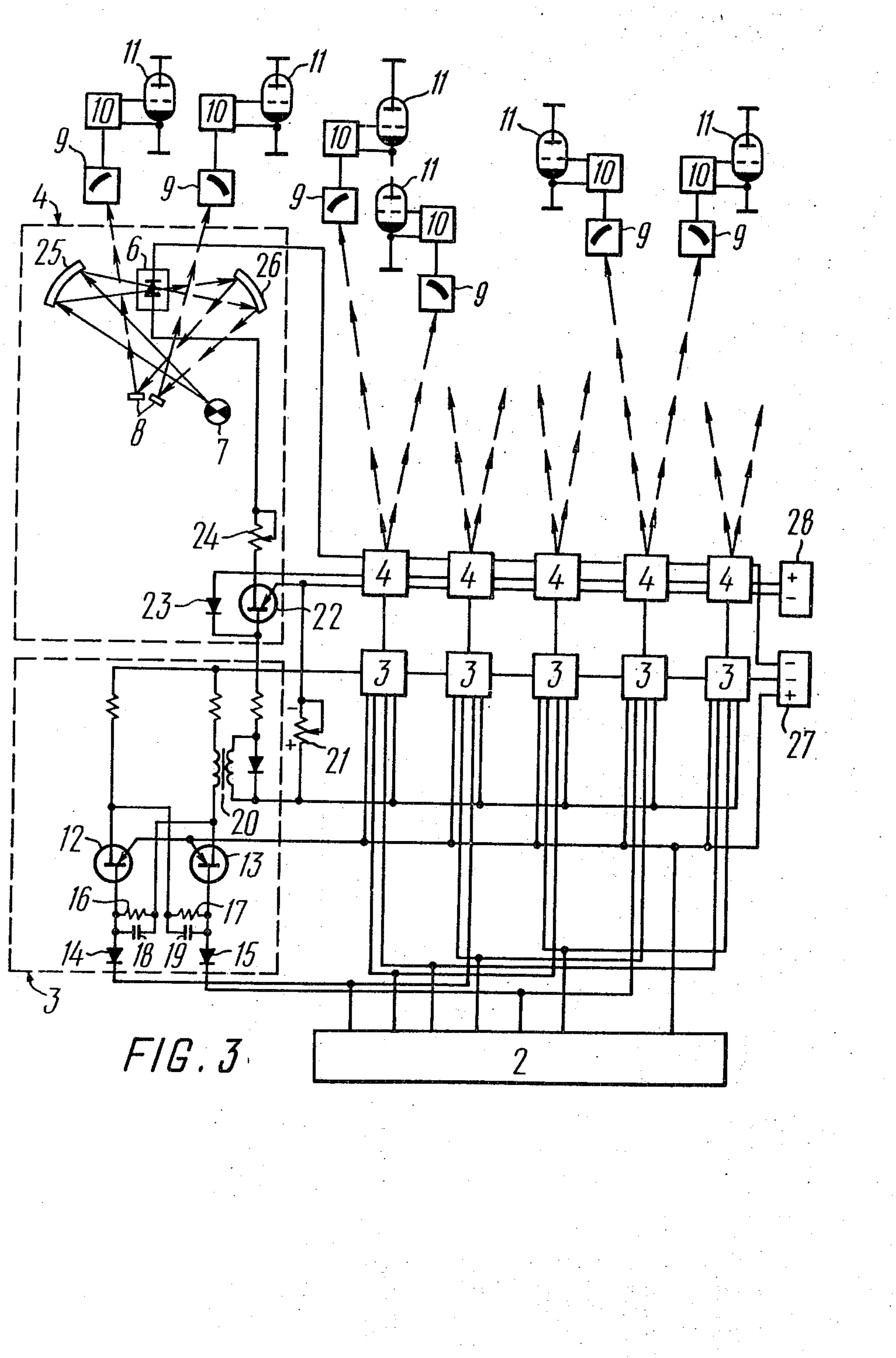
FIG. 3 is a detailed functional block diagram of one channel of the device for optical control of rectifiers.

FIGS. 2 and 3 show a multi-channel device for optical control of rectifiers, which comprises twelve identical channels to control respectively twelve rectifiers in a three-phase converter bridge, every arm of the bridge including two rectifiers. Since all the channels operate in a similar manner, the following description will pertain only to the operation of a single channel.

Every channel is triggered by the primary pulse transmitter 2 which actuates the master pulse trigger 3 using transistors 12, 13 (FIG. 3).

The primary pulse transmitter 2 is a six-phase generator of narrow pulses which are produced by differentiating a linear commutation voltage fed to the converter bridge. From the output of the transmitter 2, the narrow pulses are applied, via diodes 14, 15, to the inputs of the transistors 12, 13 of the master pulse trigger 3.

In the absence of narrow triggering pulses from the transmitter 2, the transistors 12, 13 of the master pulse trigger 3 will be in the stable state, i.e. one of the transistors 12, 13 will be conducting and the other will be non-conducting.

When narrow pulses from the primary pulse transmitter 2 arrive to the inputs of the transistors 12, 13, the arms of the master pulse trigger 3 will be commutated in a cyclic manner.

To keep any one of the transistors 12, 13 (FIG. 3) conducting within an interval between two pulses after a narrow master pulse from the primary pulse transmitter 2 is over, the device employs a positive feedback circuit comprising resistors 16, 17 and capacitors 18, 19.

Included in the collector circuit of the transistor 13 is the primary of an intermediate pulse transformer 20, the secondary whereof is connected, via a resistor 21, to the input of the single-stage transistor amplifier 5 using a transistor 22 that serves as the input element of the PWM-converter 4 of the light flux.

In addition to the single-stage transistor amplifier 5 using the transistor 22, the PWM-converter 4 of the light flux comprises a diode 23 connected to the base circuit of the transistor 22 and an adjusting resistor 24 connected to the collector circuit of the transistor 22. Connected in series with the adjusting resistor 24 is the semiconductor optical modulator 6. Focusing mirrors 24, 26 are used to focus the light produced by the continuous light flux emission source 7 onto the optical facets of the modulator 6. The optical signal from the output of the optical modulator 6 is fed to the optical splitter 8.

When the transistor 13 is conducting, a square current pulse passes through the primary of the intermediate pulse transformer 20. Induced in the secondary of the transformer is a voltage pulse which serves as an input signal to render the transistor 22 conducting for a time interval equal to the duration of the input signal.

During the whole of the time interval when the triggering current pulse arriving from the secondary of the intermediate pulse transformer 20 is present at the input of the transistor 22, there will occur, across the resistor 21, a slight voltage drop with a polarity that allows this voltage to serve as a cutoff signal for all the other single-stage amplifiers 5 using the transistors 22 which happen to be non-conducting at the moment.

During the time interval when the transistor 22 is conducting, there will be a direct current flowing therethrough from a power supply 27. While flowing through the semiconductor optical modulator 6, this current makes the optical facet thereof opaque for the light flux from the source 7, which flux is focused onto the facet.

Thus, optical signals appear to be in anti-phase with respect to current pulses passing through the semiconductor optical modulator.

The function of focusing the light beam in the device and that of breaking it up into a plurality of beams can be performed either by a reflecting or by a lens optical means.

The optical arrangement of the device shown in FIG. 3 uses a reflecting optical means.

The light flux from the source 7 is collected by a concave mirror 25, then focused onto an optical facet of the semiconductor modulator 6.

After modulation, the light flux leaves the semiconductor optical modulator 6 and strikes a concave mirror 26 to be reflected therefrom as a parallel beam of light towards the optical splitter 8 which is arranged as a set of flat mirrors or semi-phase plates, each provided with a separate rotator assembly.

Light beams reflected from every element of the optical splitter 8 in the form of optical signals are applied to respective rectifiers 11 which are at a high rectifier potential.

At the rectifier potential, optical signals are focused onto the photoreceptor 9 which converts them into electric pulses to be applied to the input of the control pulse amplifier 10. The latter produces control pulses of the required amplitude and duration, which trigger the high-voltage rectifier 11.

Should the necessity arise that optical control signals stop arriving to the rectifiers simultaneously, a cutoff bias voltage from the cutoff bias source 28 is applied, via the diode 23, to the input of the single-stage transistor amplifier 5 using the transistor 22. The cutoff bias source 28 will be triggered by a command either from a protection device or from a key operated manually. Thus, all the transistors 22 irrespective of the phase will be rendered non-conducting to remain in this state until the cutoff bias is removed.

What is claimed is:

1. A multi-channel device for optical control of converter bridge rectifiers in D.C. transmission lines comprising n identical channels, n being equal to the number of arms in the converter bridge; a shaper of wide square pulses included in each said channel and a pulse-width modulation converter of the light flux connected in series with said shaper of wide square pulses in each said channel, all these elements being at the earth potential; each said shaper of wide square pulses including a master pulse trigger which has its input connected to a primary pulse transmitter; each said pulse-width modulation converter of the light flux, including a semiconductor optical modulator which receives focused optical signals from a light-flux emission source to be directed to an optical splitter and which is electrically coupled to a single-stage transistor amplifier whose input is connected to said master pulse trigger of said shaper of wide square pulses; a photoreceptor which receives split optical signals from said optical splitter and converts them into electric pulses; a control pulse amplifier coupled to said photoreceptor to receive electrical pulses from the output thereof; and high-voltage rectifiers connected to said control pulse amplifier, all these elements being at the rectifier potential in the respective channel.

2. A multi-channel device as claimed in claim 1, wherein the input of each said transistor amplifier is connected to a common cutoff bias source serving to block control pulses from passing to high-voltage rectifiers of the converter bridge.

3. A multi-channel device as claimed in claim 1, wherein the inputs of said single-stage transistor amplifiers in the PWM-converter of the light flux are connected to a common resistor serving as an element which automatically produces a cutoff bias for all the single-stage transistor amplifiers.

4. A multi-channel device as claimed in claim 2, wherein the inputs of said single stage transistor amplifiers in the PWM-converter of the light flux are connected to a common resistor serving as an element which automatically produces a cutoff bias for all the single-stage transistor amplifiers.

5. A multi-channel device as claimed in claim 1, wherein the optical splitter of the modulated optical signal is made as a set of reflectors such as flat mirrors, arranged in the path of the modulated optical signal.

* * * * *